(12) United States Patent
Li et al.

(10) Patent No.: US 12,078,783 B2
(45) Date of Patent: Sep. 3, 2024

(54) CAMERA LENS GROUP INCLUDING FIVE LENSES OF −+−+− or −+++− REFRACTIVE POWERS

(71) Applicant: ZHEJIANG SUNNY OPTICS CO., LTD., Yuyao Zhejiang (CN)

(72) Inventors: Long Li, Yuyao Zhejiang (CN); Liefeng Zhao, Yuyao Zhejiang (CN); Fujian Dai, Yuyao Zhejiang (CN)

(73) Assignee: ZHEJIANG SUNNY OPTICS CO., LTD., Yuyao Zhejiang (CN)

( * ) Notice: Subject to any disclaimer, the term of this patent is extended or adjusted under 35 U.S.C. 154(b) by 826 days.

(21) Appl. No.: 17/199,581

(22) Filed: Mar. 12, 2021

(65) Prior Publication Data

US 2022/0137364 A1  May 5, 2022

(30) Foreign Application Priority Data

Oct. 29, 2020  (CN) .......................... 202011182939.6

(51) Int. Cl.
  G02B 13/00   (2006.01)
  G02B 9/60    (2006.01)
(52) U.S. Cl.
  CPC .......... G02B 13/0045 (2013.01); G02B 9/60 (2013.01)
(58) Field of Classification Search
  CPC .............................. G02B 13/0045; G02B 9/60
  See application file for complete search history.

(56) References Cited

U.S. PATENT DOCUMENTS

2018/0341086 A1* 11/2018 Tseng ....................... G02B 9/60
2020/0292789 A1    9/2020 Jhang et al.
2020/0400923 A1   12/2020 Song et al.

FOREIGN PATENT DOCUMENTS

CN        110262015 A  *  9/2019  ......... G02B 13/0045
WO      2020/073703 A1     4/2020
WO   WO-2021097927 A1  *  5/2021  ......... G02B 13/0015

OTHER PUBLICATIONS

WO2021097927, translation (Year: 2021).*
CN110262015 (Year: 2019).*
Indian First Examination Report dated May 30, 2022, in connection with India Application No. 202114010138.

* cited by examiner

*Primary Examiner* — Wen Huang
(74) *Attorney, Agent, or Firm* — Norris McLaughlin, P.A.

(57) ABSTRACT

The present disclosure discloses a camera lens group including, sequentially from an object side to an image side along an optical axis, a first lens having negative refractive power and a concave image-side surface; a stop; a second lens having positive refractive power and a convex image-side surface; a third lens having refractive power and a concave image-side surface; a fourth lens having positive refractive power and a convex image-side surface; and a fifth lens having negative refractive power, a convex object-side surface and a concave image-side surface. A maximum field-of-view FOV of the camera lens group satisfies: FOV>114°. A maximum distortion of the camera lens group is within 8%.

10 Claims, 9 Drawing Sheets

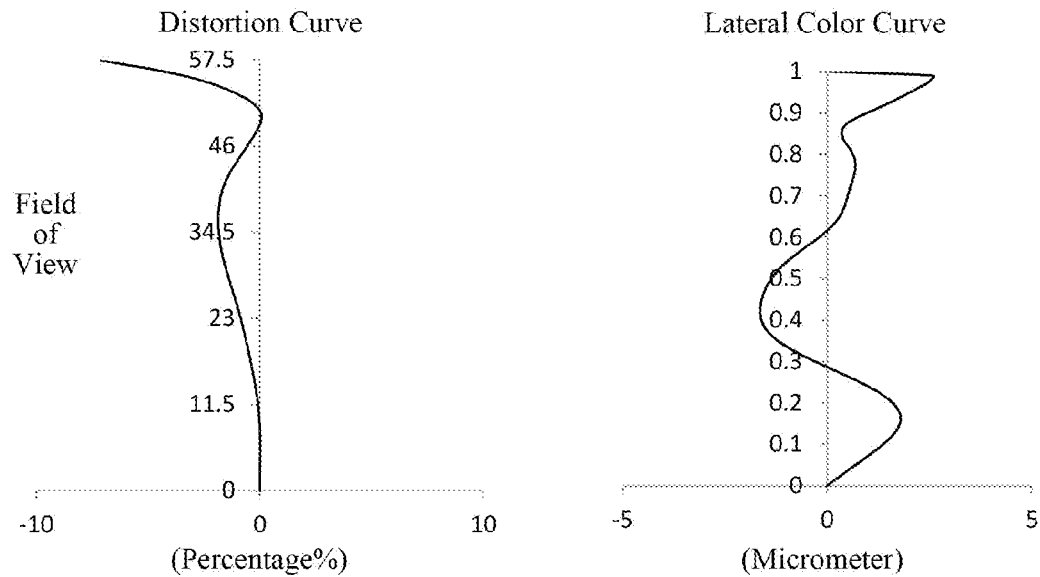
Fig. 6C
Fig. 6D
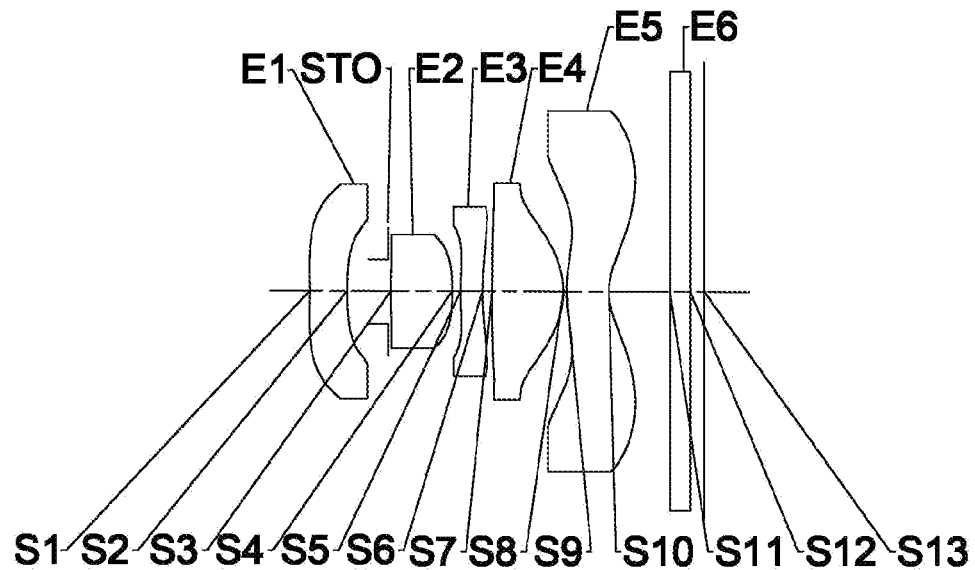
Fig. 7

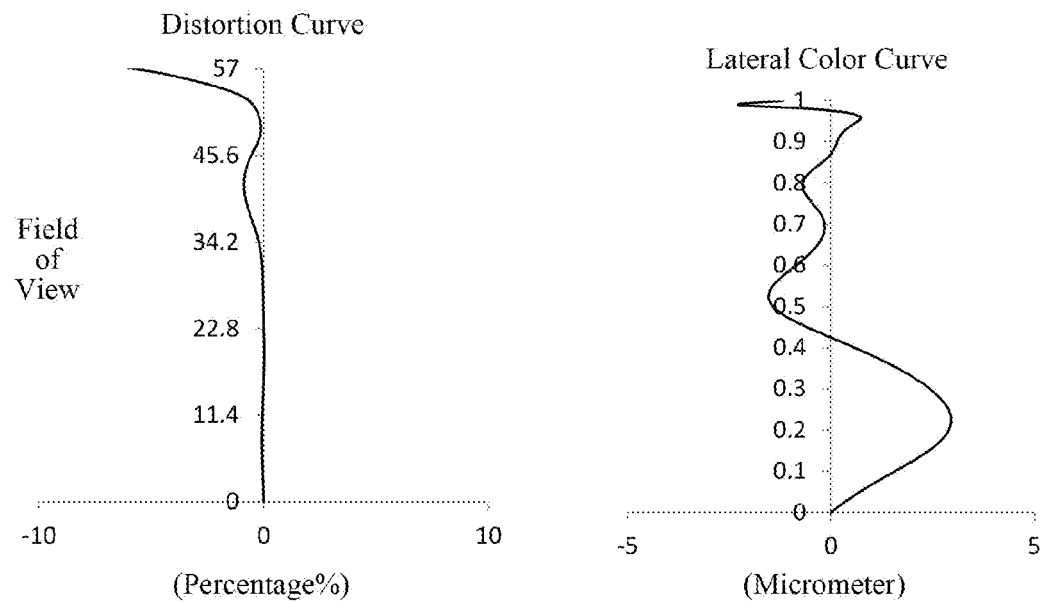
Fig. 10C
Fig. 10D
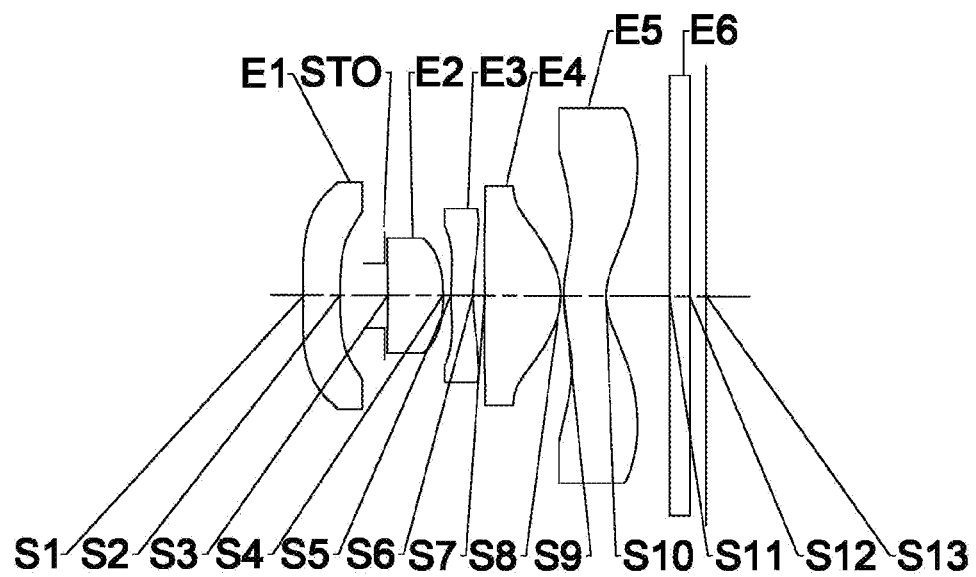
Fig. 11

CAMERA LENS GROUP INCLUDING FIVE LENSES OF −+−+− or −+++− REFRACTIVE POWERS

CROSS-REFERENCE TO RELATED APPLICATION

This application claims benefit of priority to Chinese Patent Application No. 202011182939.6 filed on Oct. 29, 2020 before the China National Intellectual Property Administration, the entire disclosure of which is incorporated herein by reference in its entity.

TECHNICAL FIELD

The present disclosure relates to the field of optical elements, and more specifically, relates to a camera lens group.

BACKGROUND

Portable devices, such as mobile phones, are usually equipped with camera modules to enable the mobile phone to have a camera function. The camera module is usually provided with a Charge-Coupled Device (CCD) type image sensor or a Complementary Metal-Oxide Semiconductor (CMOS) type image sensor, and provided with a camera lens group. The camera lens group may collect the light from the object side. The imaging light travels along the optical path of the camera lens group and irradiates the image sensor, and then the image sensor converts the light signal into an electrical signal to form image data.

The camera lens group is an important part of the imaging device, which has a great influence on the image quality. The camera lens group may be designed for different performance, such as wide-angle lens assembly. The wide-angle lens assembly is a camera lens group with a larger field-of-view, which will cause obvious barrel distortion when shooting. In particular, noticeable distortion will appear in the edge area. If the imaging device needs to be equipped with an ultra-wide-angle lens assembly, the barrel distortion in the image will be more obvious.

Traditional design for wide-angle lens assembly is difficult to avoid this defect. Usually, the defect will be corrected by an algorithm provided in the terminal, but it is still expected that the camera lens group itself may have the effect of small distortion.

SUMMARY

The present disclosure provides a camera lens group which includes, sequentially from an object side to an image side along an optical axis, a first lens having negative refractive power, and an image-side surface thereof may be concave; a stop; a second lens having positive refractive power, and an image-side surface thereof may be convex; a third lens having refractive power, and an image-side surface thereof may be concave; a fourth lens having positive refractive power, and an image-side surface thereof may be convex; and a fifth lens having negative refractive power, an object-side surface thereof may be convex, and an image-side surface thereof may be concave. A maximum field-of-view FOV of the camera lens group may satisfy: $FOV>114°$. A maximum distortion of the camera lens group may be within 8%.

In one embodiment, at least one of an object-side surface of the first lens to the image-side surface of the fifth lens is aspheric.

In one embodiment, an effective focal length f2 of the second lens and a total effective focal length f of the camera lens group may satisfy: $1.00<f2/f<3.00$.

In one embodiment, a combined focal length f12 of the first lens and the second lens and a distance BFL from the image-side surface of the fifth lens to an imaging plane of the camera lens group along the optical axis may satisfy: $2.00<f12/BFL<6.00$.

In one embodiment, a radius of curvature R9 of the object-side surface of the fifth lens and a radius of curvature R10 of the image-side surface of the fifth lens may satisfy: $2.00<(R9+R10)/(R9-R10)<3.50$.

In one embodiment, a radius of curvature R4 of the image-side surface of the second lens and a radius of curvature R8 of the image-side surface of the fourth lens may satisfy: $1.00<R4/R8<3.50$.

In one embodiment, a radius of curvature R6 of the image-side surface of the third lens and a total effective focal length f of the camera lens group may satisfy: $1.00<R6/f<3.00$.

In one embodiment, a center thickness CT4 of the fourth lens along the optical axis and a center thickness CT5 of the fifth lens along the optical axis may satisfy: $3.00<(CT4+CT5)/(CT4-CT5)<8.00$.

In one embodiment, a spaced interval T12 between the first lens and the second lens along the optical axis and a spaced interval T45 between the fourth lens and the fifth lens along the optical axis may satisfy: $12.00<T12/T45<17.00$.

In one embodiment, SAG11, being an on-axis distance from an intersection of an object-side surface of the first lens and the optical axis to a vertex of an effective radius of the object-side surface of the first lens, and SAG12, being an on-axis distance from an intersection of the image-side surface of the first lens and the optical axis to a vertex of an effective radius of the image-side surface of the first lens, may satisfy: $4.00<(SAG11+SAG12)/(SAG11-SAG12)<6.00$.

In one embodiment, an edge thickness ET1 of the first lens and an edge thickness ET2 of the second lens may satisfy: $4.00<(ET1+ET2)/(ET2-ET1)<6.00$.

In one embodiment, a maximum effective radius DT51 of the object-side surface of the fifth lens and a maximum effective radius DT52 of the image-side surface of the fifth lens may satisfy: $6.00<(DT51+DT52)/(DT52-DT51)<9.00$.

In another aspect, the present disclosure provides a camera lens group which includes, sequentially from an object side to an image side along an optical axis, a first lens having negative refractive power, and an image-side surface thereof may be concave; a stop; a second lens having positive refractive power, and an image-side surface thereof may be convex; a third lens having refractive power, and an image-side surface thereof may be concave; a fourth lens having positive refractive power, and an image-side surface thereof may be convex; and a fifth lens having negative refractive power, an object-side surface thereof may be convex, and an image-side surface thereof may be concave. An edge thickness ET1 of the first lens and an edge thickness ET2 of the second lens may satisfy: $4.00<(ET1+ET2)/(ET2-ET1)<6.00$. A maximum distortion of the camera lens group may be within 8%.

In one embodiment, an effective focal length f2 of the second lens and a total effective focal length f of the camera lens group may satisfy: $1.00<f2/f<3.00$.

In one embodiment, a combined focal length f12 of the first lens and the second lens and a distance BFL from the image-side surface of the fifth lens to an imaging plane of the camera lens group along the optical axis may satisfy: $2.00 < f12/BFL < 6.00$.

In one embodiment, a radius of curvature R9 of the object-side surface of the fifth lens and a radius of curvature R10 of the image-side surface of the fifth lens may satisfy: $2.00 < (R9+R10)/(R9-R10) < 3.50$.

In one embodiment, a radius of curvature R4 of the image-side surface of the second lens and a radius of curvature R8 of the image-side surface of the fourth lens may satisfy: $1.00 < R4/R8 < 3.50$.

In one embodiment, a radius of curvature R6 of the image-side surface of the third lens and a total effective focal length f of the camera lens group may satisfy: $1.00 < R6/f < 3.00$.

In one embodiment, a center thickness CT4 of the fourth lens along the optical axis and a center thickness CT5 of the fifth lens along the optical axis may satisfy: $3.00 < (CT4+CT5)/(CT4-CT5) < 8.00$.

In one embodiment, a spaced interval T12 between the first lens and the second lens along the optical axis and a spaced interval T45 between the fourth lens and the fifth lens along the optical axis may satisfy: $12.00 < T12/T45 < 17.00$.

In one embodiment, a maximum field-of-view FOV of the camera lens group may satisfy: $FOV > 114°$.

In one embodiment, SAG11, being an on-axis distance from an intersection of an object-side surface of the first lens and the optical axis to a vertex of an effective radius of the object-side surface of the first lens, and SAG12, being an on-axis distance from an intersection of the image-side surface of the first lens and the optical axis to a vertex of an effective radius of the image-side surface of the first lens, may satisfy: $4.00 < (SAG11+SAG12)/(SAG11-SAG12) < 6.00$.

In one embodiment, a maximum effective radius DT51 of the object-side surface of the fifth lens and a maximum effective radius DT52 of the image-side surface of the fifth lens may satisfy: $6.00 < (DT51+DT52)/(DT52-DT51) < 9.00$.

The present disclosure employs five lenses, and the above camera lens group has at least one beneficial effect, such as wide-angle, and small distortion and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIGS. 6A to 6D illustrate longitudinal aberration curves, astigmatic curves, a distortion curve, and a lateral color curve of the camera lens group of the example 3, respectively.

FIG. 7 illustrates a schematic structural view of a camera lens group according to example 4 of the present disclosure.

FIGS. 10A to 10D illustrate longitudinal aberration curves, astigmatic curves, a distortion curve, and a lateral color curve of the camera lens group of the example 5, respectively.

FIG. 11 illustrates a schematic structural view of a camera lens group according to example 6 of the present disclosure.

DETAILED DESCRIPTION OF EMBODIMENTS

Figure 1:
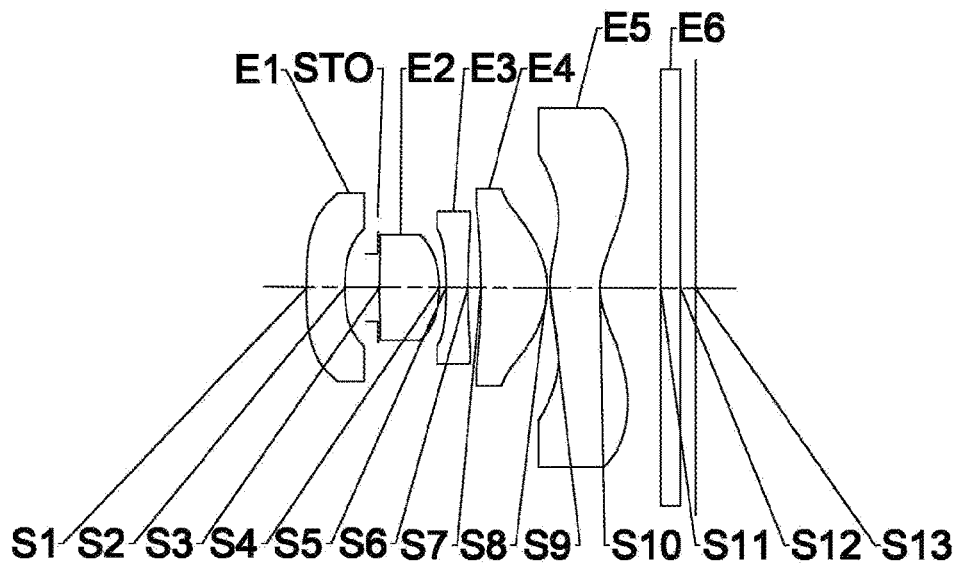
FIG. 1 illustrates a schematic structural view of a camera lens group according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A camera lens group according to an exemplary embodiment of the present disclosure may include, for example, five lenses having refractive power. The five lenses are a first lens, a second lens, a third lens, a fourth lens and a fifth lens. The five lenses are arranged sequentially from an object side to an image side along an optical axis. Among the first lens to the fifth lens, there may be an air interval between each two adjacent lenses.

In an exemplary embodiment, the first lens may have negative refractive power, and an image-side surface thereof may be concave; the second lens may have positive refractive power, and an image-side surface thereof may be convex; the third lens may have positive or negative refractive power, and an image-side surface thereof may be concave; the fourth lens may have positive refractive power, and an image-side surface thereof may be convex; and the fifth lens may have negative refractive power, an object-side surface thereof may be convex, and an image-side surface thereof may be concave. By configuring the first lens to have negative refractive power and a concave image-side surface, it is beneficial to increase the imaging angle of view of the camera lens group, thereby broadening the field of view of the camera lens group. By configuring the second lens to have positive refractive power and a convex image-side surface, it is beneficial to increase the maximum field-of-view of the camera lens group. At the same time, it is beneficial to keep the light in the center field-of-view converging better on the imaging plane, thereby improving the overall image quality. By configuring the image-side surface of the third lens as a concave surface, it may be beneficial to further improve the aberration correction capability of the camera lens group and improve the image quality of the camera lens group. The fourth lens with positive refractive power and the fifth lens with negative refractive power and a concave image-side surface have similar functions as that of the second lens, all of which may help ensure that the camera lens group has a better aberration correction ability while increasing the FOV of the camera lens group. In addition, by configuring the image-side surface of the fourth lens to be a convex surface and the object-side surface of the fifth lens to be a convex surface, it is beneficial to improve the image quality of the edge field-of-view while increasing the imaging height of the camera lens group at the image-side surface.

In an exemplary embodiment, the above camera lens group may further include at least one stop. The stop may be disposed at an appropriate position as required, for example, between the first lens and the second lens. Optionally, the above camera lens group may further include an optical filter for correcting the color deviation and/or a protective glass for protecting the photosensitive element located on an imaging plane.

In an exemplary embodiment, a maximum distortion of the camera lens group is within 8%. The present disclosure adopts the design for the wide-angle lens assembly, which achieves the effect of greatly reducing the distortion (that is, having small distortion) by appropriately sacrificing the image quality at the edge.

In an exemplary embodiment, the camera lens group according to the present disclosure may satisfy: FOV>114°, where FOV is a maximum field-of-view of the camera lens group. More specifically, the maximum field-of-view FOV of the camera lens group may satisfy: 114.1°<FOV<115.5°. Further, a maximum distortion of the camera lens group is within 8%. The camera lens group of the present disclosure has a relatively large imaging angle of view, and there is no obvious distortion phenomenon during shooting.

In an exemplary embodiment, the camera lens group according to the present disclosure may satisfy: $1.00<f2/f<3.00$, where f2 is an effective focal length of the second lens, and f is a total effective focal length of the camera lens group. For the five-piece wide-angle lens assembly with a central stop in the present disclosure, the second lens will bear relatively large refractive power and have high sensitivity. By controlling the ratio of the effective focal length of the second lens to the total effective focal length in this range, it is beneficial to ensure the aberration correction capability of the camera lens group while avoiding the excessive concentration of the refractive power on the second lens, thereby reducing the sensitivity of the second lens and improving the production yield when manufacturing the camera lens group. More specifically, f2 and f may satisfy: $1.01<f2/f<2.51$.

In an exemplary embodiment, the camera lens group according to the present disclosure may satisfy: $2.00<f12/BFL<6.00$, where f12 is a combined focal length of the first lens and the second lens, and BFL is a distance from the image-side surface of the fifth lens to an imaging plane of the camera lens group along the optical axis. The camera lens group satisfies $2.00<f12/BFL<6.00$, which may avoid excessive concentration of the reactive power on the first lens and the second lens, and may reduce the sensitivity of the first two lenses. At the same time, it may also avoid problems such as too short back focus of the camera lens group, which is not conducive to module debugging in the later process. More specifically, f12 and BFL may satisfy: $2.04<f12/BFL<5.50$.

In an exemplary embodiment, the camera lens group according to the present disclosure may satisfy: $2.00<(R9+R10)/(R9-R10)<3.50$, where R9 is a radius of curvature of the object-side surface of the fifth lens, and R10 is a radius of curvature of the image-side surface of the fifth lens. The camera lens group satisfies $2.00<(R9+R10)/(R9-R10)<3.50$, which may improve the image quality of the center field-of-view while avoiding processing problems caused by excessive bending of the two surfaces of the fifth lens and avoiding problems such as locally image blur. More specifically, R9 and R10 may satisfy: $2.30<(R9+R10)/(R9-R10)<3.15$.

In an exemplary embodiment, the camera lens group according to the present disclosure may satisfy: 1.00<R4/R8<3.50, where R4 is a radius of curvature of the image-side surface of the second lens, and R8 is a radius of curvature of the image-side surface of the fourth lens. The camera lens group satisfies 1.00<R4/R8<3.50, which may be beneficial to increasing the maximum field-of-view of the camera lens group while maintaining better imaging quality. It is also beneficial to reduce the risk of ghost image due to the internal reflection of the fourth lens. More specifically, R4 and R8 may satisfy: 1.30<R4/R8<3.20. Further, a maximum distortion of the camera lens group is within 8%.

In an exemplary embodiment, the camera lens group according to the present disclosure may satisfy: 1.00<R6/f<3.00, where R6 is a radius of curvature of the image-side surface of the third lens, and f is a total effective focal length of the camera lens group. The camera lens group satisfies 1.00<R6/f<3.00, which may prevent the refractive power from being too concentrated on the third lens. Especially when the third lens uses a high refractive index material and the overall sensitivity thereof is relatively high, this setting may be beneficial to avoiding problems such as increased sensitivity due to excessive curvature of the image-side surface of the third lens. More specifically, R6 and f may satisfy: 1.50<R6/f<2.78.

In an exemplary embodiment, the camera lens group according to the present disclosure may satisfy: 3.00<(CT4+CT5)/(CT4−CT5)<8.00, where CT4 is a center thickness of the fourth lens along the optical axis, and CT5 is a center thickness of the fifth lens along the optical axis. The camera lens group satisfies 3.00<(CT4+CT5)/(CT4−CT5)<8.00, which may be beneficial to reducing the optical distortion of the camera lens group, and reducing the risk of ghost image due to the internal reflection of the fourth lens. At the same time, it may also avoid the overall size of the camera lens group from being too long, so that the imaging group maintains the characteristics of small size. More specifically, CT4 and CT5 may satisfy: 3.44<(CT4+CT5)/(CT4−CT5)<7.15.

In an exemplary embodiment, the camera lens group according to the present disclosure may satisfy: 12.00<T12/T45<17.00, where T12 is a spaced interval between the first lens and the second lens along the optical axis, and T45 is a spaced interval between the fourth lens and the fifth lens along the optical axis. The camera lens group satisfies 12.00<T12/T45<17.00, which is beneficial to increasing the maximum field-of-view of the camera lens group. At the same time, it is beneficial to reduce the risk of ghost images generated between the fourth lens and the fifth lens. More specifically, T12 and T45 may satisfy: 12.15<T12/T45<16.70. As an example, a maximum distortion of the camera lens group is within 8%.

In an exemplary embodiment, the camera lens group according to the present disclosure may satisfy: 4.00<(SAG11+SAG12)/(SAG11−SAG12)<6.00, where SAG11 is an on-axis distance from an intersection of an object-side surface of the first lens and the optical axis to a vertex of an effective radius of the object-side surface of the first lens, and SAG12 is an on-axis distance from an intersection of the image-side surface of the first lens and the optical axis to a vertex of an effective radius of the image-side surface of the first lens. The camera lens group satisfies 4.00<(SAG11+SAG12)/(SAG11−SAG12)<6.00, which is beneficial to increasing the maximum field-of-view of the camera lens group while avoiding the first lens being too sensitive, thereby improving the production yield of the camera lens group. More specifically, SAG11 and SAG12 may satisfy: 4.30<(SAG11+SAG12)/(SAG11−SAG12)<5.25.

In an exemplary embodiment, the camera lens group according to the present disclosure may satisfy: 4.00<(ET1+ET2)/(ET2−ET1)<6.00, where ET1 is an edge thickness of the first lens, and ET2 is an edge thickness of the second lens. The camera lens group satisfies 4.00<(ET1+ET2)/(ET2−ET1)<6.00, which is beneficial to improving the image quality while avoiding problems such as processing difficulties caused by the edge of the first lens being too thin or the edge of the second lens being too thin. Meanwhile, it is beneficial to avoid the problem of the overall size of the camera lens group being too long due to the excessive thickness of the two lenses. More specifically, ET1 and ET2 may satisfy: 4.40<(ET1+ET2)/(ET2−ET1)<5.35.

In an exemplary embodiment, the camera lens group according to the present disclosure may satisfy: 6.00<(DT51+DT52)/(DT52−DT51)<9.00, where DT51 is a maximum effective radius of the object-side surface of the fifth lens, and DT52 is a maximum effective radius of the image-side surface of the fifth lens. The camera lens group satisfies 6.00<(DT51+DT52)/(DT52−DT51)<9.00, which may be beneficial to increasing the imaging height, reducing the edge field-of-view aberration, and avoiding the aperture difference between the fourth lens and the fifth lens being excessive, thereby facilitating the assembly of the camera lens group. More specifically, DT51 and DT52 may satisfy: 6.70<(DT51+DT52)/(DT52−DT51)<8.25.

The camera lens group according to the above embodiments of the present disclosure may employ a plurality of lenses, such as five lenses as described above. By properly configuring the refractive power of each lens, the surface shape, the center thickness of each lens, and spaced intervals along the optical axis between the lenses, the size and the sensitivity of the camera lens group may be effectively reduced, and the workability of the camera lens group may be improved, such that the camera lens group is more advantageous for production processing and may be applied to portable electronic products. The image quality of the camera lens group of the present disclosure is acceptable. At the same time, the camera lens group also has excellent optical performance such as large field-of-view and small distortion.

In the embodiments of the present disclosure, at least one of the surfaces of lenses is aspheric, that is, at least one of the object-side surface of the first lens to the image-side surface of the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens and the fifth lens is aspheric. Optionally, the object-side surface and the image-side surface of each of the first lens, the second lens, the third lens, the fourth lens and the fifth lens are aspheric.

However, it will be understood by those skilled in the art that the number of lenses constituting the camera lens group may be varied to achieve the various results and advantages described in this specification without departing from the technical solution claimed by the present disclosure. For example, although the embodiment is described by taking five lenses as an example, the camera lens group is not limited to include five lenses. The camera lens group may also include other numbers of lenses if desired.

Some specific examples of a camera lens group applicable to the above embodiment will be further described below with reference to the accompanying drawings.

Example 1

A camera lens group according to example 1 of the present disclosure is described below with reference to FIG. 1 to FIG. 2D. FIG. 1 shows a schematic structural view of the camera lens group according to example 1 of the present disclosure.

As shown in FIG. 1, the camera lens group includes a first lens E1, a stop STO, a second lens E2, a third lens E3, a fourth lens E4, a fifth lens E5 and an optical filter E6, which are sequentially arranged from an object side to an image side along an optical axis.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is concave, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. The camera lens group has an imaging plane S13, and light from an object sequentially passes through the respective surfaces S1 to S12 and is finally imaged on the imaging plane S13.

Table 1 is a table illustrating basic parameters of the camera lens group of example 1, wherein the units for the radius of curvature, the thickness/distance and the focal length are millimeter (mm).

In example 1, a total effective focal length f of the camera lens group is 1.64 mm, an aperture number Fno of the camera lens group is 2.45, a distance TTL along the optical axis from the object-side surface S1 of the first lens E1 to the imaging plane S13 is 4.12 mm, half of a diagonal length ImgH of an effective pixel area on the imaging plane S13 is 2.40 mm, and a maximum field-of-view FOV is 114.2° (that is, half of the maximum field-of-view Semi-FOV is 57.1°).

In example 1, the object-side surface and the image-side surface of any one of the first lens E1 to the fifth lens E5 are aspheric. The surface shape x of each aspheric lens may be defined by using, but not limited to, the following aspheric formula:

$$x = \frac{ch^2}{1 + \sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S10 in example 1.

TABLE 1

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | 14.9054 | 0.4033 | 1.55 | 56.1 | −5.33 | 99.0000 |
| S2 | Aspheric | 2.4130 | 0.3544 | | | | −0.3472 |
| STO | Spherical | Infinite | 0.0111 | | | | |
| S3 | Aspheric | 4.7170 | 0.6338 | 1.55 | 56.1 | 1.68 | 85.9187 |
| S4 | Aspheric | −1.0845 | 0.0688 | | | | 0.9050 |
| S5 | Aspheric | −5.0374 | 0.2300 | 1.68 | 19.2 | −3.48 | 41.0376 |
| S6 | Aspheric | 4.5094 | 0.1413 | | | | 6.2253 |
| S7 | Aspheric | −5.6953 | 0.7062 | 1.55 | 56.1 | 1.68 | −5.3964 |
| S8 | Aspheric | −0.8259 | 0.0300 | | | | −1.9387 |
| S9 | Aspheric | 1.4495 | 0.5295 | 1.67 | 20.4 | −2.85 | −1.1253 |
| S10 | Aspheric | 0.7024 | 0.6414 | | | | −0.8875 |
| S11 | Spherical | Infinite | 0.2100 | 1.52 | 64.2 | | |
| S12 | Spherical | Infinite | 0.1591 | | | | |
| S13 | Spherical | Infinite | | | | | |

TABLE 2

| Surface number | A4 | A6 | A8 | A10 | A12 | A14 |
|---|---|---|---|---|---|---|
| S1 | 3.1143E−01 | 1.1500E+00 | −1.4988E+01 | 1.0171E+02 | −4.4923E+02 | 1.3521E+03 |
| S2 | 6.8468E−01 | 3.7422E+00 | −4.5847E+01 | 3.3316E+01 | 5.3720E+03 | −7.1223E+04 |
| S3 | −8.4687E−01 | 9.7534E+01 | −8.3254E+03 | 4.2131E+05 | −1.3747E+07 | 3.0132E+08 |
| S4 | 1.0554E+00 | −5.7678E+01 | 1.5475E+03 | −2.6245E+04 | 2.9415E+05 | −2.2505E+06 |
| S5 | 5.8273E−02 | −8.5055E+00 | 1.4182E+02 | −1.2337E+03 | 3.9798E+03 | 2.3548E+04 |
| S6 | −3.6525E−03 | −2.9674E+00 | 3.6958E+01 | −2.8448E+02 | 1.4300E+03 | −4.8489E+03 |
| S7 | 4.7886E−01 | −2.3929E+00 | −3.2892E+00 | 1.2888E+02 | −9.3047E+02 | 3.7562E+03 |
| S8 | 5.4016E−01 | −3.7940E+00 | 7.6158E+00 | 2.8963E+01 | −2.5674E+02 | 9.0330E+02 |
| S9 | 9.8695E−02 | −3.8140E+00 | 1.6196E+01 | −4.4299E+01 | 8.5321E+01 | −1.1690E+02 |
| S10 | −1.0551E+00 | 1.3957E+00 | −1.9629E+00 | 2.4206E+00 | −2.3341E+00 | 1.6550E+00 |

| Surface number | A16 | A18 | A20 | A22 | A24 | A26 |
|---|---|---|---|---|---|---|
| S1 | −2.8141E+03 | 4.0443E+03 | −3.9351E+03 | 2.4720E+03 | −9.0358E+02 | 1.4576E+02 |
| S2 | 4.8970E+05 | −2.0868E+06 | 5.6925E+06 | −9.6825E+06 | 9.3454E+06 | −3.9021E+06 |
| S3 | −4.5257E+09 | 4.6675E+10 | −3.2483E+11 | 1.4571E+12 | −3.8024E+12 | 4.3838E+12 |
| S4 | 1.1928E+07 | −4.3732E+07 | 1.0861E+08 | −1.7391E+08 | 1.6139E+08 | −6.5625E+07 |
| S5 | −3.2226E+05 | 1.6638E+06 | −4.9086E+06 | 8.6565E+06 | −8.5214E+06 | 3.6137E+06 |
| S6 | 1.1328E+04 | −1.8276E+04 | 1.9928E+04 | −1.3900E+04 | 5.5204E+03 | −9.2741E+02 |
| S7 | −9.7404E+03 | 1.6943E+04 | −1.9782E+04 | 1.4917E+04 | −6.5703E+03 | 1.2830E+03 |
| S8 | −1.9233E+03 | 2.6678E+03 | −2.4205E+03 | 1.3843E+03 | −4.5285E+02 | 6.4622E+01 |
| S9 | 1.1339E+02 | −7.6825E+01 | 3.5415E+01 | −1.0560E+01 | 1.8339E+00 | −1.4071E−01 |
| S10 | −8.4295E−01 | 3.0391E−01 | −7.5706E−02 | 1.2403E−02 | −1.2026E−03 | 5.2276E−05 |

Figures 2A, 2B:
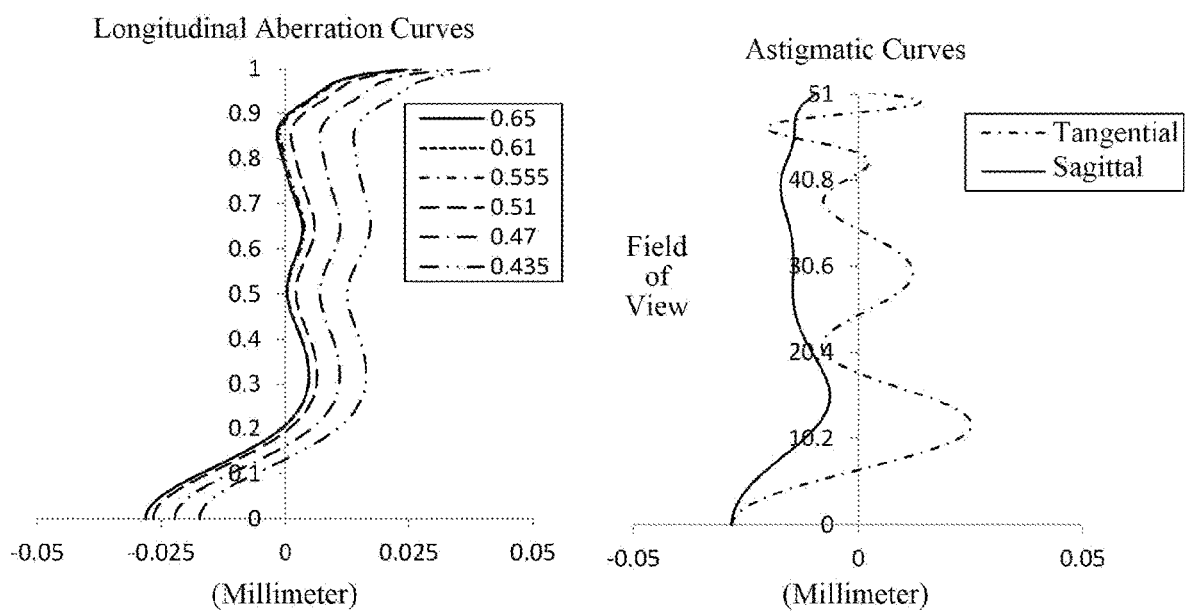
FIGS. 2A to 2D illustrate longitudinal aberration curves, astigmatic curves, a distortion curve, and a lateral color curve of the camera lens group of the example 1, respectively.
Figures 2C, 2D:
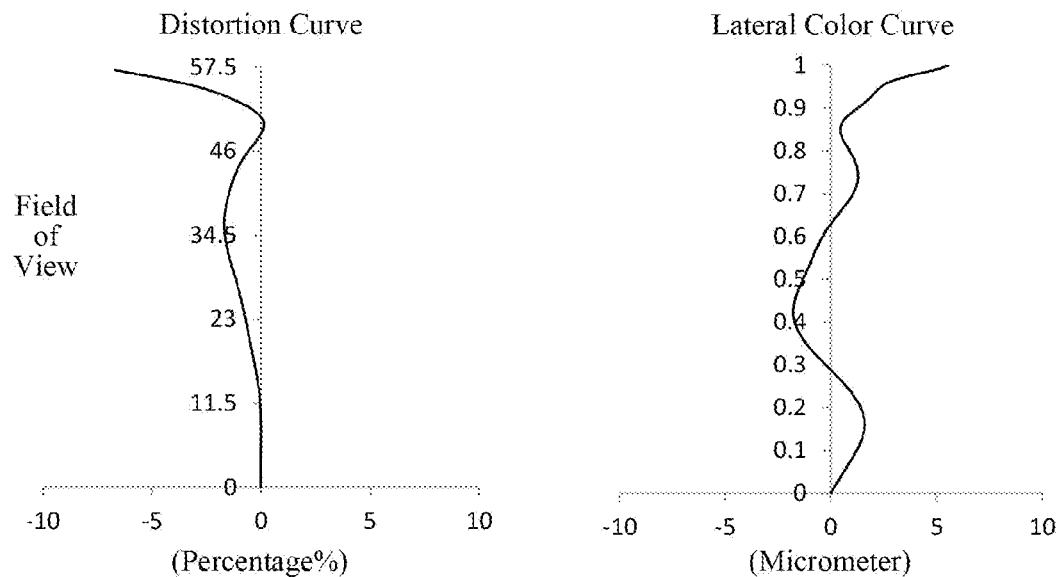

FIG. 2A illustrates longitudinal aberration curves of the camera lens group according to example 1, representing the deviations of focal points converged by light of different wavelengths after passing through the lens group. FIG. 2B illustrates astigmatic curves of the camera lens group according to example 1, representing the curvatures of a tangential plane and the curvatures of a sagittal plane. FIG. 2C illustrates a distortion curve of the camera lens group according to example 1, representing the amounts of distortion corresponding to different field-of-views. FIG. 2D illustrates a lateral color curve of the camera lens group according to example 1, representing the deviations of different image heights on an imaging plane after light passes through the lens group. It can be seen from FIG. 2A to FIG. 2D that the camera lens group provided in example 1 may achieve good image quality.

Example 2

Figure 3:
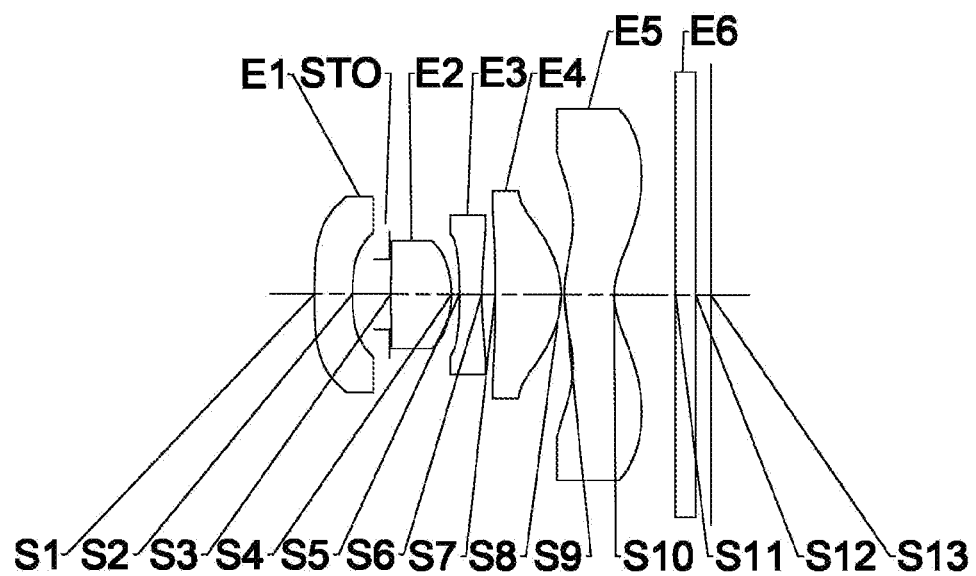
FIG. 3 illustrates a schematic structural view of a camera lens group according to example 2 of the present disclosure.

A camera lens group according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the camera lens group according to example 2 of the present disclosure.

As shown in FIG. 3, the camera lens group includes a first lens E1, a stop STO, a second lens E2, a third lens E3, a fourth lens E4, a fifth lens E5 and an optical filter E6, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is concave, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. The camera lens group has an imaging plane S13, and light from an object sequentially passes through the respective surfaces S1 to S12 and is finally imaged on the imaging plane S13.

In example 2, a total effective focal length f of the camera lens group is 1.65 mm, an aperture number Fno of the camera lens group is 2.42, a distance TTL along the optical axis from the object-side surface S1 of the first lens E1 to the imaging plane S13 is 4.13 mm, half of a diagonal length ImgH of an effective pixel area on the imaging plane S13 is 2.40 mm, and a maximum field-of-view FOV is 114.5°.

Table 3 is a table illustrating basic parameters of the camera lens group of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | −500.0000 | 0.3929 | 1.55 | 56.1 | −5.31 | −99.0000 |

TABLE 3-continued

| Surface number | Surface type | Radius of curvature | Thickness/ Distance | Material Refractive index | Abbe number | Focal length | Conic coefficient |
|---|---|---|---|---|---|---|---|
| S2 | Aspheric | 2.9194 | 0.3873 | | | | 4.0180 |
| STO | Spherical | Infinite | 0.0103 | | | | |
| S3 | Aspheric | 4.4946 | 0.6350 | 1.55 | 56.1 | 1.70 | 79.7076 |
| S4 | Aspheric | −1.1145 | 0.0872 | | | | 0.9140 |
| S5 | Aspheric | −5.5583 | 0.2300 | 1.68 | 19.2 | −3.44 | 41.2107 |
| S6 | Aspheric | 4.0871 | 0.1403 | | | | 6.8607 |
| S7 | Aspheric | −7.5665 | 0.6904 | 1.55 | 56.1 | 1.68 | −31.7011 |
| S8 | Aspheric | −0.8464 | 0.0313 | | | | −2.1572 |
| S9 | Aspheric | 1.4423 | 0.5199 | 1.67 | 20.4 | −2.85 | −0.9902 |
| S10 | Aspheric | 0.7017 | 0.6410 | | | | −0.8873 |
| S11 | Spherical | Infinite | 0.2100 | 1.52 | 64.2 | | |
| S12 | Spherical | Infinite | 0.1584 | | | | |
| S13 | Spherical | Infinite | | | | | |

TABLE 4

| Surface number | A4 | A6 | A8 | A10 | A12 | A14 |
|---|---|---|---|---|---|---|
| S1 | 4.0265E−01 | 4.5818E−01 | −9.3837E+00 | 6.6383E+01 | −2.8922E+02 | 8.4152E+02 |
| S2 | 8.9284E−01 | −2.7028E+00 | 6.7058E+01 | −1.1548E+03 | 1.2451E+04 | −8.7844E+04 |
| S3 | −7.1106E−01 | 6.9837E+01 | −5.6468E+03 | 2.6908E+05 | −8.2568E+06 | 1.7001E+08 |
| S4 | 6.6137E−01 | −3.5571E+01 | 8.7140E+02 | −1.3859E+04 | 1.4718E+05 | −1.0686E+06 |
| S5 | −2.4968E−02 | −3.3902E+00 | 1.5305E+01 | 3.9113E+02 | −7.9992E+03 | 7.4163E+04 |
| S6 | −6.1982E−02 | −4.6398E−01 | −3.9145E+00 | 7.9190E+01 | −5.7641E+02 | 2.5208E+03 |
| S7 | 4.5997E−01 | −1.7834E+00 | −7.5293E+00 | 1.3139E+02 | −8.1835E+02 | 3.0592E+03 |
| S8 | 5.6953E−01 | −4.0211E+00 | 9.3775E+00 | 1.3019E+01 | −1.5448E+02 | 5.0730E+02 |
| S9 | 1.2445E−01 | −3.9214E+00 | 1.4934E+01 | −3.4222E+01 | 5.2950E+01 | −5.7306E+01 |
| S10 | −1.0079E+00 | 9.4451E−01 | −3.9785E−01 | −5.2754E−01 | 1.1069E+00 | −9.9422E−01 |

| Surface number | A16 | A18 | A20 | A22 | A24 | A26 |
|---|---|---|---|---|---|---|
| S1 | −1.6758E+03 | 2.2909E+03 | −2.1132E+03 | 1.2562E+03 | −4.3411E+02 | 6.6176E+01 |
| S2 | 4.1966E+05 | −1.3683E+06 | 2.9974E+06 | −4.2100E+06 | 3.4118E+06 | −1.2067E+06 |
| S3 | −2.3967E+09 | 2.3182E+10 | −1.5123E+11 | 6.3571E+11 | −1.5542E+12 | 1.6788E+12 |
| S4 | 5.3501E+06 | −1.8358E+07 | 4.2080E+07 | −6.0908E+07 | 4.9452E+07 | −1.6622E+07 |
| S5 | −4.1939E+05 | 1.5458E+06 | −3.7408E+06 | 5.7457E+06 | −5.0879E+06 | 1.9799E+06 |
| S6 | −7.3140E+03 | 1.4410E+04 | −1.9092E+04 | 1.6309E+04 | −8.1235E+03 | 1.7943E+03 |
| S7 | −7.5310E+03 | 1.2539E+04 | −1.4030E+04 | 1.0125E+04 | −4.2613E+03 | 7.9475E+02 |
| S8 | −9.7150E+02 | 1.2068E+03 | −9.8464E+02 | 5.0921E+02 | −1.5136E+02 | 1.9704E+01 |
| S9 | 4.3896E+01 | −2.3684E+01 | 8.7962E+00 | −2.1384E+00 | 3.0596E−01 | −1.9512E−02 |
| S10 | 5.4447E−01 | −1.9468E−01 | 4.5636E−02 | −6.7534E−03 | 5.7089E−04 | −2.0936E−05 |

Figure 4A:
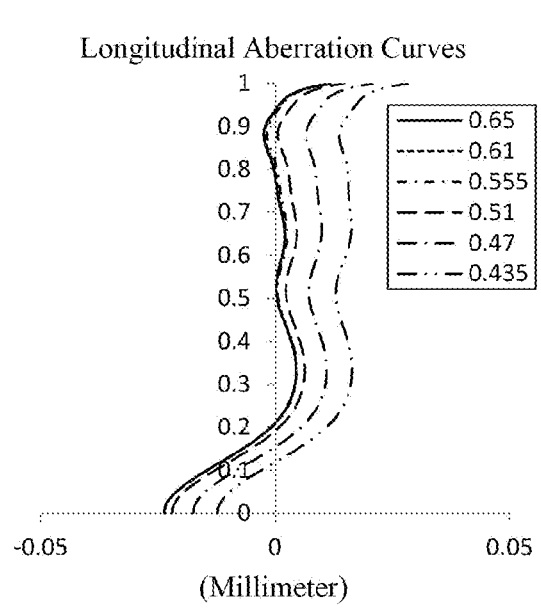
FIGS. 4A to 4D illustrate longitudinal aberration curves, astigmatic curves, a distortion curve, and a lateral color curve of the camera lens group of the example 2, respectively.
Figure 4B:
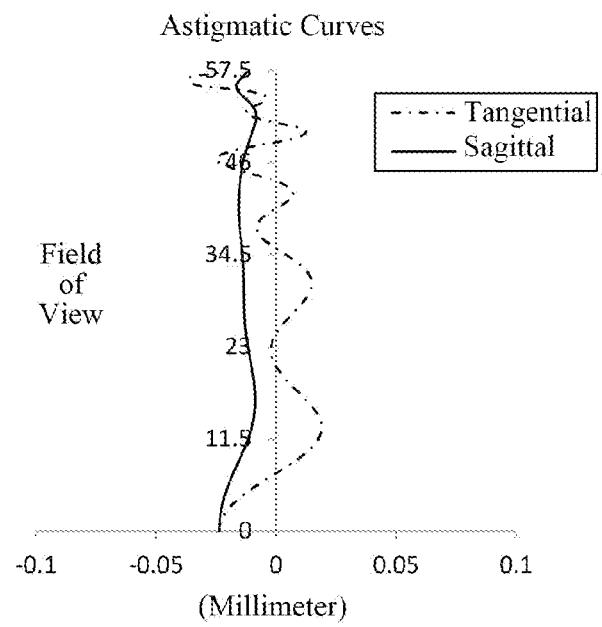
Figure 4C:
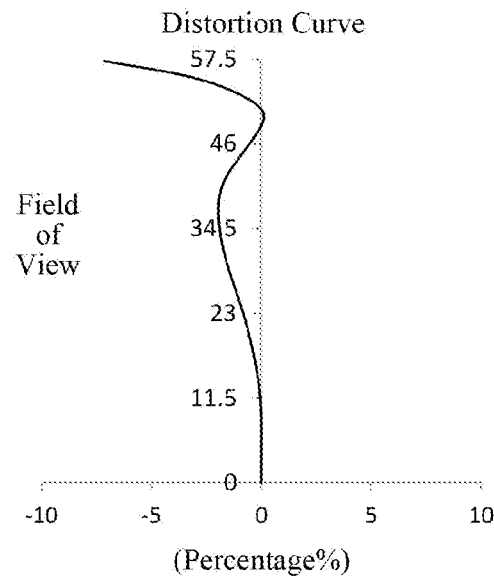
Figure 4D:
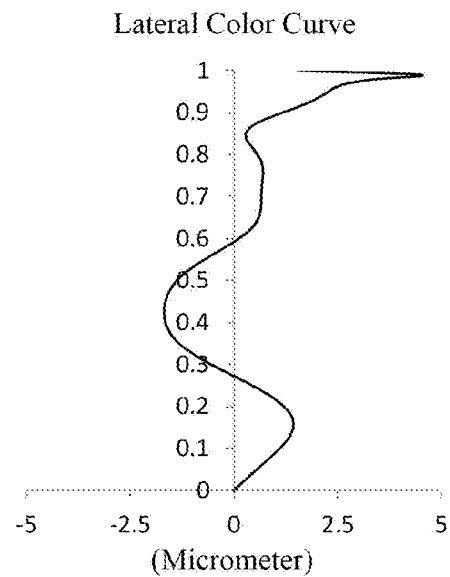

FIG. 4A illustrates longitudinal aberration curves of the camera lens group according to example 2, representing the deviations of focal points converged by light of different wavelengths after passing through the lens group. FIG. 4B illustrates astigmatic curves of the camera lens group according to example 2, representing the curvatures of a tangential plane and the curvatures of a sagittal plane. FIG. 4C illustrates a distortion curve of the camera lens group according to example 2, representing the amounts of distortion corresponding to different field-of-views. FIG. 4D illustrates a lateral color curve of the camera lens group according to example 2, representing the deviations of different image heights on an imaging plane after light passes through the lens group. It can be seen from FIG. 4A to FIG. 4D that the camera lens group provided in example 2 may achieve good image quality.

Example 3

Figure 5:
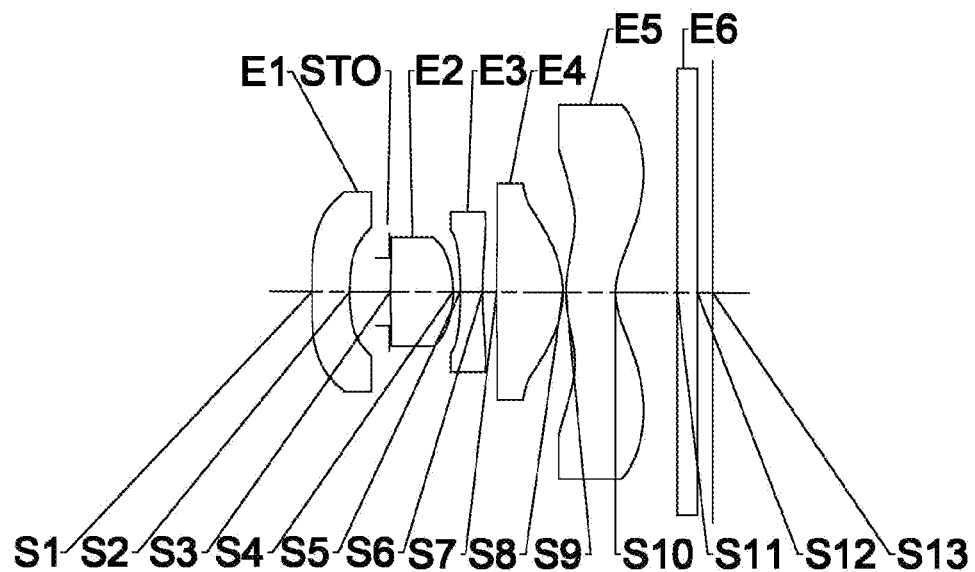
FIG. 5 illustrates a schematic structural view of a camera lens group according to example 3 of the present disclosure.

A camera lens group according to example 3 of the present disclosure is described below with reference to FIG. 5 to FIG. 6D. FIG. 5 shows a schematic structural view of the camera lens group according to example 3 of the present disclosure.

As shown in FIG. 5, the camera lens group includes a first lens E1, a stop STO, a second lens E2, a third lens E3, a fourth lens E4, a fifth lens E5 and an optical filter E6, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is concave, and an image-side surface S6 thereof is concave. The fourth lens E4 has positive refractive power, an object-side surface S7 thereof is convex, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. The camera lens group has an imaging plane S13, and light from an object sequentially passes through the respective surfaces S1 to S12 and is finally imaged on the imaging plane S13.

In example 3, a total effective focal length f of the camera lens group is 1.63 mm, an aperture number Fno of the camera lens group is 2.50, a distance TTL along the optical axis from the object-side surface S1 of the first lens E1 to the imaging plane S13 is 4.18 mm, half of a diagonal length ImgH of an effective pixel area on the imaging plane S13 is 2.40 mm, and a maximum field-of-view FOV is 114.9°.

Table 5 is a table illustrating basic parameters of the camera lens group of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

Figures 6A, 6B:
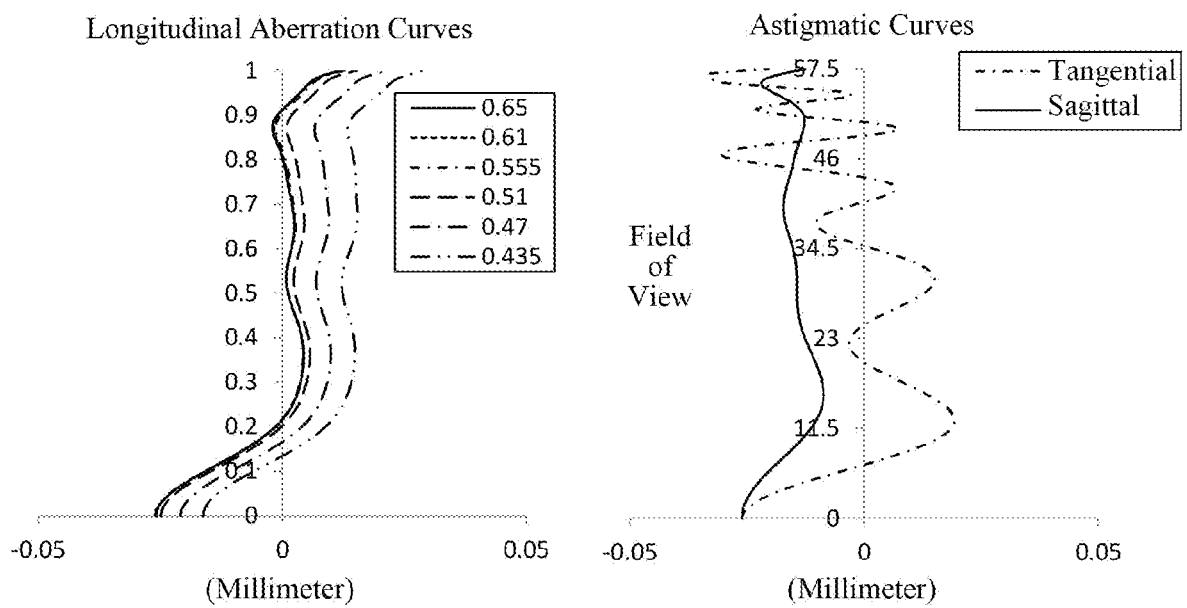

FIG. 6A illustrates longitudinal aberration curves of the camera lens group according to example 3, representing the deviations of focal points converged by light of different wavelengths after passing through the lens group. FIG. 6B illustrates astigmatic curves of the camera lens group according to example 3, representing the curvatures of a tangential plane and the curvatures of a sagittal plane. FIG. 6C illustrates a distortion curve of the camera lens group according to example 3, representing the amounts of distortion corresponding to different field-of-views. FIG. 6D illustrates a lateral color curve of the camera lens group according to example 3, representing the deviations of different image heights on an imaging plane after light passes through the lens group. It can be seen from FIG. 6A to FIG. 6D that the camera lens group provided in example 3 may achieve good image quality.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −57.5200 | 0.3923 | 1.55 | 56.1 | −5.26 | −99.0000 |
| S2 | Aspheric | 3.0293 | 0.4143 | | | | 1.1155 |
| STO | Spherical | Infinite | 0.0103 | | | | |
| S3 | Aspheric | 4.4124 | 0.6557 | 1.55 | 56.1 | 1.79 | 79.3846 |
| S4 | Aspheric | −1.1925 | 0.0771 | | | | 1.1272 |
| S5 | Aspheric | −5.3628 | 0.2300 | 1.68 | 19.2 | −3.47 | 45.2820 |
| S6 | Aspheric | 4.2531 | 0.1454 | | | | 4.5428 |
| S7 | Aspheric | 500.0000 | 0.6957 | 1.55 | 56.1 | 1.71 | −99.0000 |
| S8 | Aspheric | −0.9364 | 0.0300 | | | | −2.3386 |
| S9 | Aspheric | 1.3771 | 0.5185 | 1.67 | 20.4 | −3.13 | −0.9864 |
| S10 | Aspheric | 0.7049 | 0.6439 | | | | −0.8879 |
| S11 | Spherical | Infinite | 0.2100 | 1.52 | 64.2 | | |
| S12 | Spherical | Infinite | 0.1610 | | | | |
| S13 | Spherical | Infinite | | | | | |

TABLE 6

| Surface number | A4 | A6 | A8 | A10 | A12 | A14 |
|---|---|---|---|---|---|---|
| S1 | 3.6683E−01 | 8.5438E−01 | −1.1549E+01 | 7.0477E+01 | −2.7377E+02 | 7.2134E+02 |
| S2 | 7.7091E−01 | 9.1592E−01 | −1.5246E+01 | 6.0413E+01 | 5.2666E+02 | −8.4315E+03 |
| S3 | −9.4582E−01 | 1.0832E+02 | −9.1019E+03 | 4.5402E+05 | −1.4630E+07 | 3.1740E+08 |
| S4 | 6.6942E−01 | −3.7896E+01 | 9.4778E+02 | −1.5294E+04 | 1.6367E+05 | −1.1947E+06 |
| S5 | −1.3311E−02 | −3.5804E+00 | 2.2913E+01 | 3.1458E+02 | −8.0717E+03 | 8.0680E+04 |
| S6 | −1.8277E−02 | −2.1614E+00 | 1.9527E+01 | −1.0368E+02 | 3.3585E+02 | −5.5205E+02 |
| S7 | 4.8036E−01 | −2.7055E+00 | 1.0650E+00 | 7.9244E+01 | −5.6837E+02 | 2.1299E+03 |
| S8 | 5.8155E−01 | −4.0503E+00 | 1.0427E+01 | −6.7119E−01 | −7.5180E+01 | 2.5192E+02 |
| S9 | 9.2373E−02 | −3.6724E+00 | 1.3050E+01 | −2.7294E+01 | 3.8174E+01 | −3.7221E+01 |
| S10 | −9.5127E−01 | 7.7864E−01 | −1.5340E−01 | −6.9610E−01 | 1.1065E+00 | −8.9721E−01 |

| Surface number | A16 | A18 | A20 | A22 | A24 | A26 |
|---|---|---|---|---|---|---|
| S1 | −1.3149E+03 | 1.6591E+03 | −1.4222E+03 | 7.9020E+02 | −2.5655E+02 | 3.6911E+01 |
| S2 | 5.5604E+04 | −2.2048E+05 | 5.5703E+05 | −8.7721E+05 | 7.8267E+05 | −3.0093E+05 |
| S3 | −4.7283E+09 | 4.8455E+10 | −3.3560E+11 | 1.5001E+12 | −3.9051E+12 | 4.4959E+12 |
| S4 | 6.0243E+06 | −2.0936E+07 | 4.9077E+07 | −7.3782E+07 | 6.3837E+07 | −2.3956E+07 |
| S5 | −4.7421E+05 | 1.7837E+06 | −4.3557E+06 | 6.6993E+06 | −5.9081E+06 | 2.2806E+06 |
| S6 | −1.5155E+02 | 2.8124E+03 | −6.2616E+03 | 7.0424E+03 | −4.1803E+03 | 1.0433E+03 |
| S7 | −5.0258E+03 | 7.8478E+03 | −8.1270E+03 | 5.3807E+03 | −2.0649E+03 | 3.4963E+02 |
| S8 | −4.6251E+02 | 5.5039E+02 | −4.3444E+02 | 2.1945E+02 | −6.4131E+01 | 8.2360E+00 |
| S9 | 2.5701E+01 | −1.2530E+01 | 4.2159E+00 | −9.3000E−01 | 1.2075E−01 | −6.9740E−03 |
| S10 | 4.6011E−01 | −1.5646E−01 | 3.5180E−02 | −5.0197E−03 | 4.1055E−04 | −1.4602E−05 |

Example 4

A camera lens group according to example 4 of the present disclosure is described below with reference to FIG. 7 to FIG. 8D. FIG. 7 shows a schematic structural view of the camera lens group according to example 4 of the present disclosure.

As shown in FIG. 7, the camera lens group includes a first lens E1, a stop STO, a second lens E2, a third lens E3, a fourth lens E4, a fifth lens E5 and an optical filter E6, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is convex. The third lens E3 has positive refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. The camera lens group has an imaging plane S13, and light from an object sequentially passes through the respective surfaces S1 to S12 and is finally imaged on the imaging plane S13.

In example 4, a total effective focal length f of the camera lens group is 1.57 mm, an aperture number Fno of the camera lens group is 2.55, a distance TTL along the optical axis from the object-side surface S1 of the first lens E1 to the imaging plane S13 is 4.12 mm, half of a diagonal length ImgH of an effective pixel area on the imaging plane S13 is 2.38 mm, and a maximum field-of-view FOV is 115.9°.

Table 7 is a table illustrating basic parameters of the camera lens group of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | −7.9945 | 0.3935 | 1.55 | 56.1 | −6.58 | −98.4546 |
| S2 | Aspheric | 6.6440 | 0.4288 | | | | 32.5492 |
| STO | Spherical | Infinite | 0.0242 | | | | |
| S3 | Aspheric | 5.7900 | 0.6440 | 1.55 | 56.1 | 3.18 | 35.3544 |
| S4 | Aspheric | −2.3846 | 0.0851 | | | | 5.9936 |
| S5 | Aspheric | 3.3576 | 0.2300 | 1.68 | 19.2 | 52.33 | −94.5179 |
| S6 | Aspheric | 3.6062 | 0.1008 | | | | 0.8653 |
| S7 | Aspheric | −15.8486 | 0.7444 | 1.55 | 56.1 | 1.46 | −61.2338 |
| S8 | Aspheric | −0.7700 | 0.0300 | | | | −2.1817 |
| S9 | Aspheric | 1.6403 | 0.4435 | 1.67 | 20.4 | −2.05 | −0.9872 |
| S10 | Aspheric | 0.6652 | 0.6386 | | | | −0.8942 |
| S11 | Spherical | Infinite | 0.2100 | 1.52 | 64.2 | | |
| S12 | Spherical | Infinite | 0.1477 | | | | |
| S13 | Spherical | Infinite | | | | | |

TABLE 8

| Surface number | A4 | A6 | A8 | A10 | A12 | A14 |
|---|---|---|---|---|---|---|
| S1 | 3.3416E−01 | 6.2908E−01 | −7.6540E+00 | 3.8939E+01 | −1.2604E+02 | 2.7846E+02 |
| S2 | 5.7496E−01 | 3.2265E+00 | −6.5997E+01 | 7.1718E+02 | −5.1603E+03 | 2.5624E+04 |
| S3 | −7.3629E−01 | 7.9890E+01 | −6.6984E+03 | 3.3837E+05 | −1.1100E+07 | 2.4570E+08 |
| S4 | 4.2301E−01 | −5.2271E+01 | 1.2794E+03 | −1.9898E+04 | 2.0669E+05 | −1.4764E+06 |
| S5 | −2.4966E−01 | −1.5351E+00 | −2.3070E+01 | 8.5293E+02 | −1.1729E+04 | 9.1532E+04 |
| S6 | 2.3516E−01 | −7.9731E+00 | 1.0552E+02 | −8.0972E+02 | 3.8874E+03 | −1.2392E+04 |
| S7 | 7.4691E−01 | −1.1019E+01 | 1.0303E+02 | −5.8782E+02 | 2.1835E+03 | −5.5370E+03 |
| S8 | 7.0143E−01 | −5.8354E+00 | 2.0562E+01 | −3.2611E+01 | −1.6445E+01 | 1.9157E+02 |
| S9 | 1.7540E−01 | −5.1782E+00 | 2.2373E+01 | −6.0775E+01 | 1.1312E+02 | −1.4695E+02 |
| S10 | −1.1912E+00 | 1.5814E+00 | −2.0966E+00 | 2.3837E+00 | −2.1824E+00 | 1.5460E+00 |

| Surface number | A16 | A18 | A20 | A22 | A24 | A26 |
|---|---|---|---|---|---|---|
| S1 | −4.2801E+02 | 4.5718E+02 | −3.3258E+02 | 1.5703E+02 | −4.3340E+01 | 5.2978E+00 |
| S2 | −8.8522E+04 | 2.1150E+05 | −3.4175E+05 | 3.5571E+05 | −2.1510E+05 | 5.7447E+04 |
| S3 | −3.7394E+09 | 3.9203E+10 | −2.7823E+11 | 1.2771E+12 | −3.4218E+12 | 4.0654E+12 |
| S4 | 7.3455E+06 | −2.5393E+07 | 5.9735E+07 | −9.1090E+07 | 8.1087E+07 | −3.1947E+07 |
| S5 | −4.5008E+05 | 1.4496E+06 | −3.0637E+06 | 4.1035E+06 | −3.1641E+06 | 1.0714E+06 |
| S6 | 2.7066E+04 | −4.0805E+04 | 4.1798E+04 | −2.7777E+04 | 1.0794E+04 | −1.8589E+03 |
| S7 | 9.8051E+03 | −1.2145E+04 | 1.0319E+04 | −5.7320E+03 | 1.8742E+03 | −2.7343E+02 |
| S8 | −4.3096E+02 | 5.3687E+02 | −4.1215E+02 | 1.9357E+02 | −5.1027E+01 | 5.7817E+00 |

TABLE 8-continued

| | | | | | | |
|---|---|---|---|---|---|---|
| S9 | 1.3401E+02 | −8.5297E+01 | 3.7075E+01 | −1.0480E+01 | 1.7350E+00 | −1.2758E−01 |
| S10 | −8.2389E−01 | 3.2032E−01 | −8.7254E−02 | 1.5654E−02 | −1.6520E−03 | 7.7378E−05 |

Figure 8A:
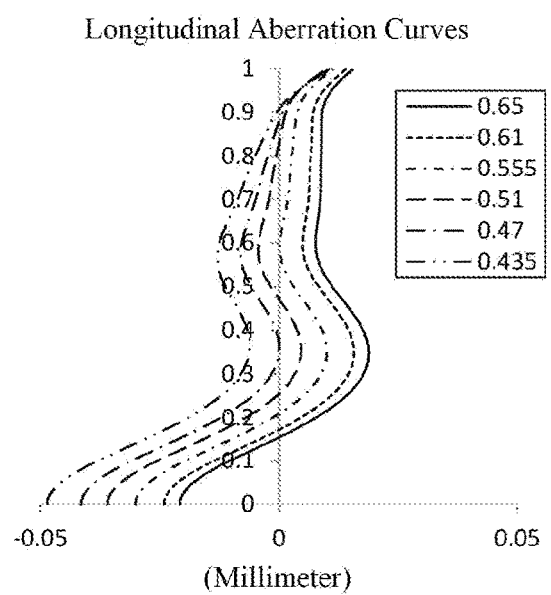
FIGS. 8A to 8D illustrate longitudinal aberration curves, astigmatic curves, a distortion curve, and a lateral color curve of the camera lens group of the example 4, respectively.
Figure 8B:
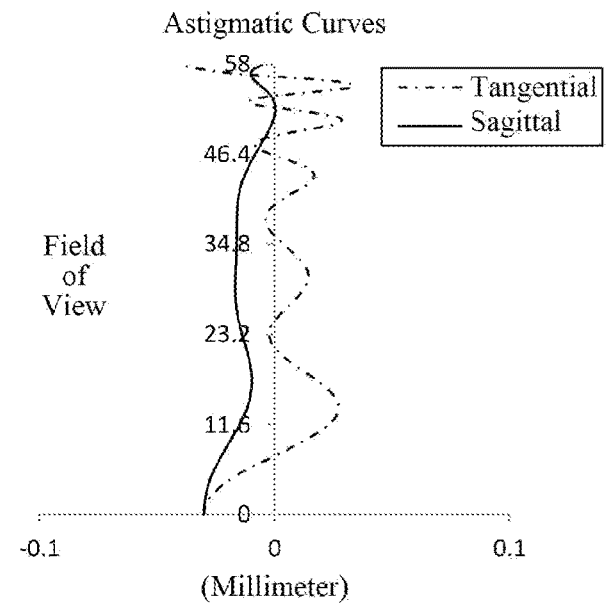
Figure 8C:
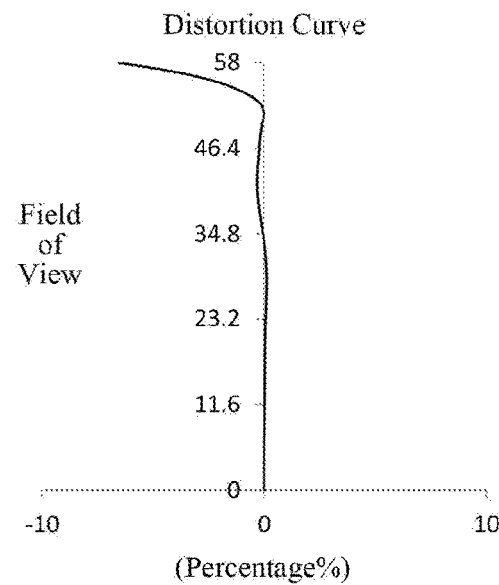
Figure 8D:
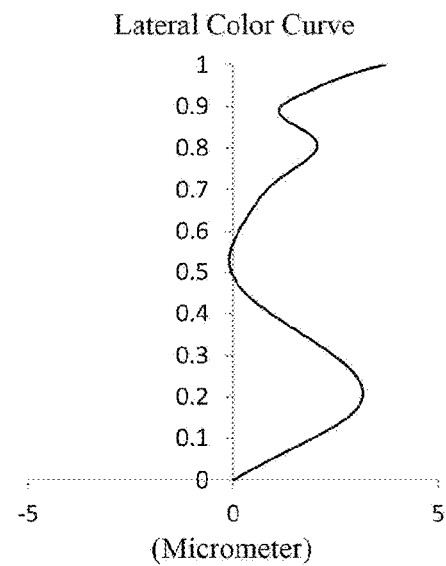

FIG. 8A illustrates longitudinal aberration curves of the camera lens group according to example 4, representing the deviations of focal points converged by light of different wavelengths after passing through the lens group. FIG. 8B illustrates astigmatic curves of the camera lens group according to example 4, representing the curvatures of a tangential plane and the curvatures of a sagittal plane. FIG. 8C illustrates a distortion curve of the camera lens group according to example 4, representing the amounts of distortion corresponding to different field-of-views. FIG. 8D illustrates a lateral color curve of the camera lens group according to example 4, representing the deviations of different image heights on an imaging plane after light passes through the lens group. It can be seen from FIG. 8A to FIG. 8D that the camera lens group provided in example 4 may achieve good image quality.

Example 5

Figure 9:
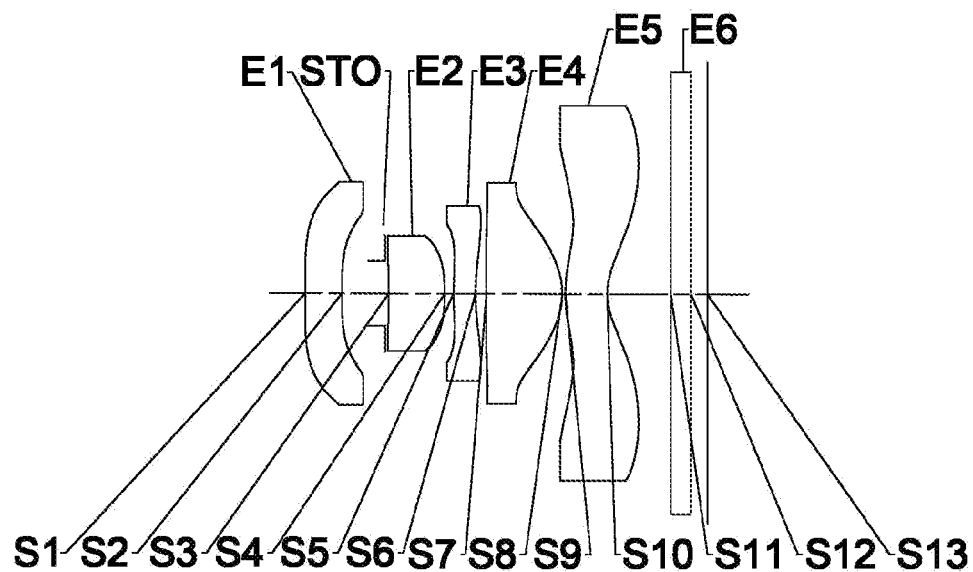
FIG. 9 illustrates a schematic structural view of a camera lens group according to example 5 of the present disclosure.

A camera lens group according to example 5 of the present disclosure is described below with reference to FIG. 9 to FIG. 10D. FIG. 9 shows a schematic structural view of the camera lens group according to example 5 of the present disclosure.

As shown in FIG. 9, the camera lens group includes a first lens E1, a stop STO, a second lens E2, a third lens E3, a fourth lens E4, a fifth lens E5 and an optical filter E6, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is concave, and an image-side surface S4 thereof is convex. The third lens E3 has positive refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. The camera lens group has an imaging plane S13, and light from an object sequentially passes through the respective surfaces S1 to S12 and is finally imaged on the imaging plane S13.

In example 5, a total effective focal length f of the camera lens group is 1.64 mm, an aperture number Fno of the camera lens group is 2.55, a distance TTL along the optical axis from the object-side surface S1 of the first lens E1 to the imaging plane S13 is 4.20 mm, half of a diagonal length ImgH of an effective pixel area on the imaging plane S13 is 2.38 mm, and a maximum field-of-view FOV is 114.2°.

Table 9 is a table illustrating basic parameters of the camera lens group of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −11.6512 | 0.3822 | 1.55 | 56.1 | −10.58 | −86.9177 |
| S2 | Aspheric | 11.5769 | 0.4525 | | | | 51.5323 |
| STO | Spherical | Infinite | 0.0357 | | | | |
| S3 | Aspheric | −500.0000 | 0.5863 | 1.55 | 56.1 | 4.08 | −99.0000 |
| S4 | Aspheric | −2.2164 | 0.0914 | | | | 4.4594 |
| S5 | Aspheric | 2.7436 | 0.2300 | 1.68 | 19.2 | 500.00 | −99.0000 |
| S6 | Aspheric | 2.6724 | 0.1137 | | | | −6.3887 |
| S7 | Aspheric | −8.3942 | 0.7925 | 1.55 | 56.1 | 1.35 | −99.0000 |
| S8 | Aspheric | −0.7019 | 0.0321 | | | | −2.1896 |
| S9 | Aspheric | 1.6624 | 0.4369 | 1.67 | 20.4 | −1.98 | −0.7531 |
| S10 | Aspheric | 0.6576 | 0.6638 | | | | −0.8945 |
| S11 | Spherical | Infinite | 0.2100 | 1.52 | 64.2 | | |
| S12 | Spherical | Infinite | 0.1736 | | | | |
| S13 | Spherical | Infinite | | | | | |

TABLE 10

| Surface number | A4 | A6 | A8 | A10 | A12 | A14 |
|---|---|---|---|---|---|---|
| S1 | 3.1980E−01 | 3.6300E−01 | −5.2938E+00 | 2.7096E+01 | −8.6850E+01 | 1.8977E+02 |
| S2 | 5.9919E−01 | −3.1282E−01 | −8.9880E+00 | 1.0924E+02 | −7.2605E+02 | 3.1678E+03 |
| S3 | −2.5266E−01 | −3.3700E+00 | −4.5331E−01 | 1.2517E+04 | −8.1867E+05 | 2.6902E+07 |

TABLE 10-continued

| | | | | | |
|---|---|---|---|---|---|
| S4 | −8.4752E−01 | 5.3311E−01 | −1.5671E+01 | 4.4778E+02 | −8.1794E+03 | 9.3705E+04 |
| S5 | −2.5180E−01 | 2.9199E+00 | −8.7314E+01 | 9.2867E+02 | −6.1372E+03 | 2.8375E+04 |
| S6 | −1.4702E−01 | 4.8174E+00 | −5.9294E+01 | 3.5905E+02 | −1.3944E+03 | 3.8147E+03 |
| S7 | 1.1757E−01 | 2.2257E+00 | −1.7325E+01 | 6.6655E+01 | −1.9112E+02 | 4.7901E+02 |
| S8 | 4.6059E−01 | −3.4014E+00 | 1.1270E+01 | −2.2124E+01 | 3.1930E+01 | −5.8697E+01 |
| S9 | 1.6834E−01 | −3.4872E+00 | 1.3162E+01 | −3.1130E+01 | 4.9262E+01 | −5.3175E+01 |
| S10 | −1.1407E+00 | 1.4985E+00 | −1.8095E+00 | 1.6001E+00 | −9.6439E−01 | 3.7314E−01 |

| Surface number | A16 | A18 | A20 | A22 | A24 | A26 |
|---|---|---|---|---|---|---|
| S1 | −2.8895E+02 | 3.0641E+02 | −2.2171E+02 | 1.0428E+02 | −2.8713E+01 | 3.5063E+00 |
| S2 | −9.3920E+03 | 1.8964E+04 | −2.5576E+04 | 2.1958E+04 | −1.0818E+04 | 2.3234E+03 |
| S3 | −5.3940E+08 | 6.9860E+09 | −5.8850E+10 | 3.1195E+11 | −9.4605E+11 | 1.2526E+12 |
| S4 | −6.8337E+05 | 3.2329E+06 | −9.9204E+06 | 1.9094E+07 | −2.0977E+07 | 1.0046E+07 |
| S5 | −9.3473E+04 | 2.1632E+05 | −3.4090E+05 | 3.4616E+05 | −2.0314E+05 | 5.2145E+04 |
| S6 | −7.5723E+03 | 1.0861E+04 | −1.0946E+04 | 7.3302E+03 | −2.9199E+03 | 5.2254E+02 |
| S7 | −9.9560E+02 | 1.5272E+03 | −1.5950E+03 | 1.0608E+03 | −4.0386E+02 | 6.6913E+01 |
| S8 | 1.3203E+02 | −2.1348E+02 | 2.1241E+02 | −1.2521E+02 | 4.0326E+01 | −5.4814E+00 |
| S9 | 3.9685E+01 | −2.0525E+01 | 7.2432E+00 | −1.6692E+00 | 2.2702E−01 | −1.3851E−02 |
| S10 | −7.7460E−02 | −1.3153E−03 | 5.7886E−03 | −1.6484E−03 | 2.1481E−04 | −1.1326E−05 |

Figure 10A:
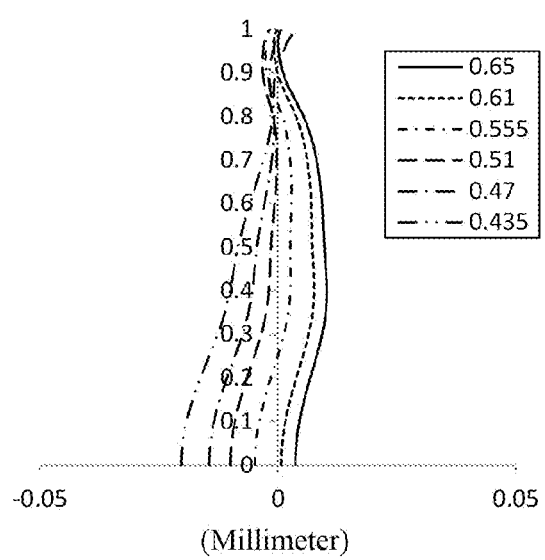
Figure 10B:
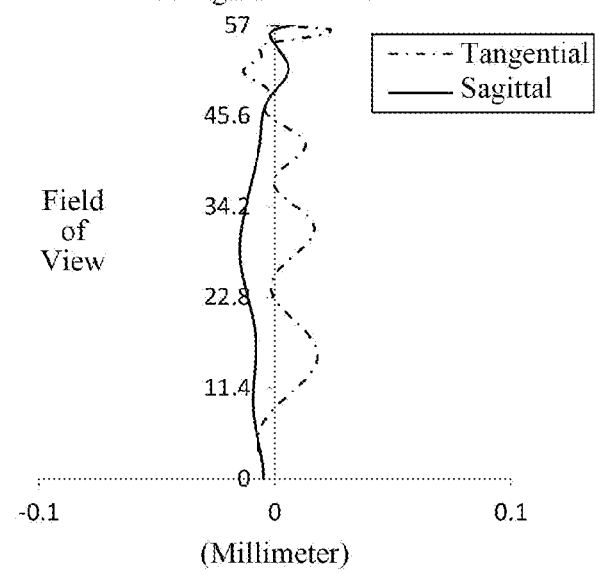

FIG. 10A illustrates longitudinal aberration curves of the camera lens group according to example 5, representing the deviations of focal points converged by light of different wavelengths after passing through the lens group. FIG. 10B illustrates astigmatic curves of the camera lens group according to example 5, representing the curvatures of a tangential plane and the curvatures of a sagittal plane. FIG. 10C illustrates a distortion curve of the camera lens group according to example 5, representing the amounts of distortion corresponding to different field-of-views. FIG. 10D illustrates a lateral color curve of the camera lens group according to example 5, representing the deviations of different image heights on an imaging plane after light passes through the lens group. It can be seen from FIG. 10A to FIG. 10D that the camera lens group provided in example 5 may achieve good image quality.

Example 6

A camera lens group according to example 6 of the present disclosure is described below with reference to FIG. 11 to FIG. 12D. FIG. 11 shows a schematic structural view of the camera lens group according to example 6 of the present disclosure.

As shown in FIG. 11, the camera lens group includes a first lens E1, a stop STO, a second lens E2, a third lens E3, a fourth lens E4, a fifth lens E5 and an optical filter E6, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is concave, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. The camera lens group has an imaging plane S13, and light from an object sequentially passes through the respective surfaces S1 to S12 and is finally imaged on the imaging plane S13.

In example 6, a total effective focal length f of the camera lens group is 1.62 mm, an aperture number Fno of the camera lens group is 2.55, a distance TTL along the optical axis from the object-side surface S1 of the first lens E1 to the imaging plane S13 is 4.21 mm, half of a diagonal length ImgH of an effective pixel area on the imaging plane S13 is 2.38 mm, and a maximum field-of-view FOV is 115.4°.

Table 11 is a table illustrating basic parameters of the camera lens group of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −9.5812 | 0.3814 | 1.55 | 56.1 | −9.86 | −94.6706 |
| S2 | Aspheric | 12.4531 | 0.4635 | | | | 99.0000 |
| STO | Spherical | Infinite | 0.0368 | | | | |
| S3 | Aspheric | −500.0000 | 0.5751 | 1.55 | 56.1 | 3.71 | 99.0000 |
| S4 | Aspheric | −2.0179 | 0.0826 | | | | 3.6552 |
| S5 | Aspheric | 2.8045 | 0.2300 | 1.68 | 19.2 | −43.18 | −99.0000 |
| S6 | Aspheric | 2.4744 | 0.1207 | | | | −9.0194 |
| S7 | Aspheric | −6.7246 | 0.7974 | 1.55 | 56.1 | 1.34 | −99.0000 |

TABLE 11-continued

| Surface number | Surface type | Radius of curvature | Thickness/ Distance | Material Refractive index | Abbe number | Focal length | Conic coefficient |
|---|---|---|---|---|---|---|---|
| S8 | Aspheric | −0.6859 | 0.0300 | | | | −2.1502 |
| S9 | Aspheric | 1.6524 | 0.4408 | 1.67 | 20.4 | −1.99 | −0.7787 |
| S10 | Aspheric | 0.6571 | 0.6639 | | | | −0.8945 |
| S11 | Spherical | Infinite | 0.2100 | 1.52 | 64.2 | | |
| S12 | Spherical | Infinite | 0.1741 | | | | |
| S13 | Spherical | Infinite | | | | | |

TABLE 12

| Surface number | A4 | A6 | A8 | A10 | A12 | A14 |
|---|---|---|---|---|---|---|
| S1 | 3.1959E−01 | 2.5277E−01 | −4.0965E+00 | 2.0111E+01 | −6.1549E+01 | 1.2874E+02 |
| S2 | 5.5108E−01 | 3.2978E−01 | −1.4030E+01 | 1.3011E+02 | −7.5003E+02 | 2.9637E+03 |
| S3 | −2.3024E−01 | −1.0285E+01 | 6.9292E+02 | −2.7061E+04 | 5.9679E+05 | −6.4570E+06 |
| S4 | −5.6657E−01 | −8.5671E+00 | 1.4090E+02 | −1.5287E+03 | 1.1191E+04 | −4.8409E+04 |
| S5 | 4.5070E−02 | −7.3074E+00 | 6.0947E+01 | −5.6011E+02 | 4.6788E+03 | −2.7487E+04 |
| S6 | 7.7938E−02 | 1.1501E+00 | −3.1775E+01 | 2.1675E+02 | −8.2388E+02 | 2.0621E+03 |
| S7 | 2.1255E−01 | 1.2493E+00 | −1.1449E+01 | 3.8545E+01 | −8.7692E+01 | 2.1184E+02 |
| S8 | 4.9274E−01 | −3.9456E+00 | 1.5169E+01 | −4.1017E+01 | 9.9202E+01 | −2.3076E+02 |
| S9 | 1.9252E−01 | −3.7168E+00 | 1.4226E+01 | −3.3641E+01 | 5.2777E+01 | −5.6334E+01 |
| S10 | −1.1669E+00 | 1.5856E+00 | −1.9310E+00 | 1.6749E+00 | −9.5748E−01 | 3.2531E−01 |

| Surface number | A16 | A18 | A20 | A22 | A24 | A26 |
|---|---|---|---|---|---|---|
| S1 | −1.8814E+02 | 1.9185E+02 | −1.3369E+02 | 6.0632E+01 | −1.6112E+01 | 1.9003E+00 |
| S2 | −8.1552E+03 | 1.5517E+04 | −1.9911E+04 | 1.6363E+04 | −7.7460E+03 | 1.6025E+03 |
| S3 | −7.8464E+06 | 1.2257E+09 | −1.7026E+10 | 1.1726E+11 | −4.2101E+11 | 6.2894E+11 |
| S4 | 7.1103E+04 | 4.0737E+05 | −2.6814E+06 | 7.0563E+06 | −9.2943E+06 | 5.0321E+06 |
| S5 | 1.0953E+05 | −2.9748E+05 | 5.4496E+05 | −6.4582E+05 | 4.4743E+05 | −1.3755E+05 |
| S6 | −3.6143E+03 | 4.5180E+03 | −3.9803E+03 | 2.3581E+03 | −8.4359E+02 | 1.3753E+02 |
| S7 | −5.2906E+02 | 9.8297E+02 | −1.1776E+03 | 8.5864E+02 | −3.4752E+02 | 5.9945E+01 |
| S8 | 4.3888E+02 | −5.8619E+02 | 5.1242E+02 | −2.7771E+02 | 8.4562E+01 | −1.1055E+01 |
| S9 | 4.1572E+01 | −2.1281E+01 | 7.4441E+00 | −1.7032E+00 | 2.3041E−01 | −1.4008E−02 |
| S10 | −3.7949E−02 | −1.9212E−02 | 1.0830E−02 | −2.5295E−03 | 3.0262E−04 | −1.5148E−05 |

Figure 12A:
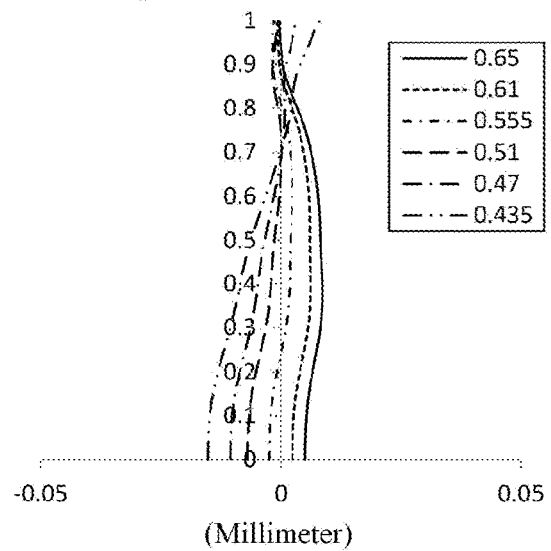
FIGS. 12A to 12D illustrate longitudinal aberration curves, astigmatic curves, a distortion curve, and a lateral color curve of the camera lens group of the example 6, respectively.
Figure 12B:
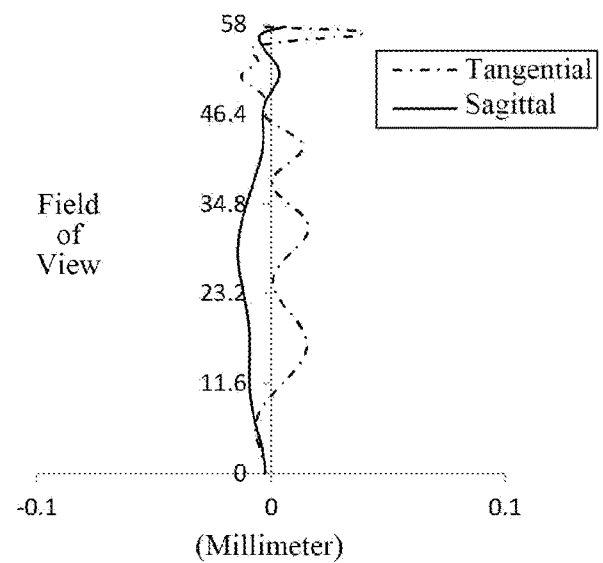
Figure 12C:
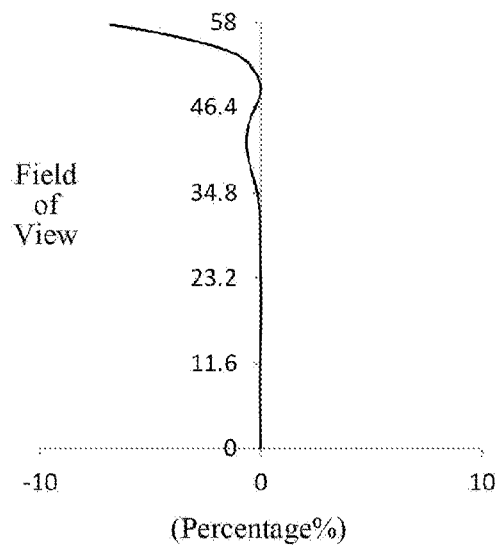
Figure 12D:
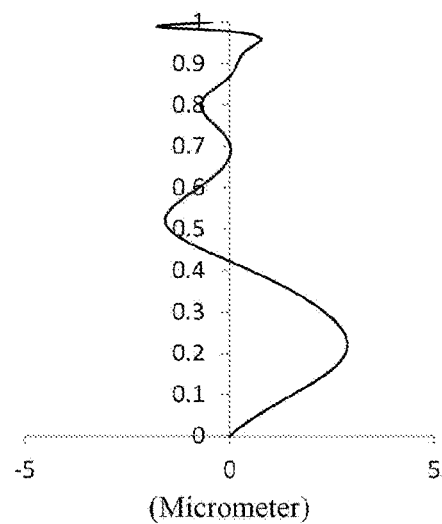

FIG. 12A illustrates longitudinal aberration curves of the camera lens group according to example 6, representing the deviations of focal points converged by light of different wavelengths after passing through the lens group. FIG. 12B illustrates astigmatic curves of the camera lens group according to example 6, representing the curvatures of a tangential plane and the curvatures of a sagittal plane. FIG. 12C illustrates a distortion curve of the camera lens group according to example 6, representing the amounts of distortion corresponding to different field-of-views. FIG. 12D illustrates a lateral color curve of the camera lens group according to example 6, representing the deviations of different image heights on an imaging plane after light passes through the lens group. It can be seen from FIG. 12A to FIG. 12D that the camera lens group provided in example 6 may achieve good image quality.

In view of the above, examples 1 to 6 respectively satisfy the relationship shown in Table 13.

TABLE 13

| Conditional/Example | 1 | 2 | 3 | 4 | 5 | 6 |
|---|---|---|---|---|---|---|
| f2/f | 1.02 | 1.04 | 1.10 | 2.02 | 2.49 | 2.29 |
| f12/BFL | 2.05 | 2.06 | 2.19 | 4.92 | 5.49 | 4.87 |
| (R9 + R10)/(R9 − R10) | 2.88 | 2.89 | 3.10 | 2.36 | 2.31 | 2.32 |
| R4/R8 | 1.31 | 1.32 | 1.27 | 3.10 | 3.16 | 2.94 |
| R6/f | 2.74 | 2.48 | 2.60 | 2.29 | 1.63 | 1.53 |
| (CT4 + CT5)/(CT4 − CT5) | 6.99 | 7.10 | 6.85 | 3.95 | 3.46 | 3.47 |
| T12/T45 | 12.18 | 12.69 | 14.15 | 15.10 | 15.22 | 16.68 |
| (SAG11 + SAG12)/(SAG11 − SAG12) | 4.32 | 5.08 | 5.22 | 4.69 | 4.37 | 4.56 |
| (ET1 + ET2)/(ET2 − ET1) | 5.10 | 5.30 | 4.69 | 4.41 | 4.65 | 5.26 |
| (DT51 + DT52)/(DT52 − DT51) | 6.73 | 7.56 | 7.71 | 6.85 | 8.22 | 8.17 |
| Maximum Distortion | −6.70% | −7.15% | −7.14% | −6.50% | −6.00% | −6.80% |

The present disclosure further provides an imaging apparatus, which is provided with an electronic photosensitive element for imaging. The electronic photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the camera lens group described above.

The foregoing is only a description of the preferred examples of the present disclosure and the applied technical principles. It should be appreciated by those skilled in the art that the protective scope of the present disclosure is not limited to the technical solutions formed by the particular combinations of the above technical features. The protective scope should also cover other technical solutions formed by any combinations of the above technical features or equivalent features thereof without departing from the concept of the present disclosure, such as, technical solutions formed by replacing the features as disclosed in the present disclosure with (but not limited to), technical features with similar functions.

What is claimed is:

1. A camera lens group, sequentially from an object side to an image side of the camera lens group along an optical axis, comprising:
   a first lens having negative refractive power and a concave image-side surface;
   a stop;
   a second lens having positive refractive power and a convex image-side surface;
   a third lens having refractive power and a concave image-side surface;
   a fourth lens having positive refractive power and a convex image-side surface; and
   a fifth lens having negative refractive power, a convex object-side surface and a concave image-side surface,
   wherein FOV>114°, where FOV is a maximum field-of-view of the camera lens group;
   a maximum distortion of the camera lens group is within 8%; and
   wherein $4.00 < (SAG11+SAG12)/(SAG11-SAG12) < 6.00$, where SAG11 is an on-axis distance from an intersection of an object-side surface of the first lens and the optical axis to a vertex of an effective radius of the object-side surface of the first lens, and SAG12 is an on-axis distance from an intersection of the image-side surface of the first lens and the optical axis to a vertex of an effective radius of the image-side surface of the first lens.

2. The camera lens group according to claim 1, wherein $1.00 < f2/f < 3.00$,
   where f2 is an effective focal length of the second lens, and f is a total effective focal length of the camera lens group.

3. The camera lens group according to claim 1, wherein $2.00 < f12/BFL < 6.00$,
   where f12 is a combined focal length of the first lens and the second lens, and BFL is a distance from the image-side surface of the fifth lens to an imaging plane of the camera lens group along the optical axis.

4. The camera lens group according to claim 1, wherein $2.00 < (R9+R10)/(R9-R10) < 3.50$,
   where R9 is a radius of curvature of the object-side surface of the fifth lens, and R10 is a radius of curvature of the image-side surface of the fifth lens.

5. The camera lens group according to claim 1, wherein $1.00 < R4/R8 < 3.50$,
   where R4 is a radius of curvature of the image-side surface of the second lens, and R8 is a radius of curvature of the image-side surface of the fourth lens.

6. The camera lens group according to claim 1, wherein $1.00 < R6/f < 3.00$,
   where R6 is a radius of curvature of the image-side surface of the third lens, and f is a total effective focal length of the camera lens group.

7. The camera lens group according to claim 1, wherein $3.00 < (CT4+CT5)/(CT4-CT5) < 8.00$,
   where CT4 is a center thickness of the fourth lens along the optical axis, and CT5 is a center thickness of the fifth lens along the optical axis.

8. The camera lens group according to claim 1, wherein $12.00 < T12/T45 < 17.00$,
   where T12 is a spaced interval between the first lens and the second lens along the optical axis, and T45 is a spaced interval between the fourth lens and the fifth lens along the optical axis.

9. The camera lens group according to claim 1, wherein $4.00 < (ET1+ET2)/(ET2-ET1) < 6.00$,
   where ET1 is an edge thickness of the first lens, and ET2 is an edge thickness of the second lens.

10. The camera lens group according to claim 1, wherein $6.00 < (DT51+DT52)/(DT52-DT51) < 9.00$,
    where DT51 is a maximum effective radius of the object-side surface of the fifth lens, and DT52 is a maximum effective radius of the image-side surface of the fifth lens.

* * * * *